United States Patent
Eskilson

(10) Patent No.: US 6,345,529 B1
(45) Date of Patent: Feb. 12, 2002

(54) METHOD OF GEAR CHANGING IN A MOTOR VEHICLE

(75) Inventor: Anders Eskilson, Stockholm (SE)

(73) Assignee: Scania CV Aktiebolag (SE)

( * ) Notice: Subject to any disclaimer, the term of this patent is extended or adjusted under 35 U.S.C. 154(b) by 0 days.

(21) Appl. No.: 09/462,286

(22) PCT Filed: Jun. 24, 1998

(86) PCT No.: PCT/SE98/01228

§ 371 Date: Jan. 5, 2000

§ 102(e) Date: Jan. 5, 2000

(87) PCT Pub. No.: WO99/02360

PCT Pub. Date: Jan. 21, 1999

(30) Foreign Application Priority Data

Jul. 7, 1997 (SE) .............................................. 9702611

(51) Int. Cl.⁷ .............................................. G01M 19/00
(52) U.S. Cl. ................................................... 73/118.1
(58) Field of Search ............................ 73/117.3, 118.1; 74/336 R, 335, 473.11; 474/18; 477/154

(56) References Cited

U.S. PATENT DOCUMENTS

| | | | |
|---|---|---|---|
| 5,211,680 A | 5/1993 | Sumimoto et al. | ............ 74/858 |
| 5,595,551 A | * 1/1997 | Hedstrom et al. | .......... 477/109 |
| 5,866,809 A | * 2/1999 | Soderman | .................. 73/117.3 |

FOREIGN PATENT DOCUMENTS

| | | |
|---|---|---|
| SE | 502807 | 1/1996 |
| SE | 504717 | 4/1997 |

* cited by examiner

*Primary Examiner*—Benjamin R. Fuller
*Assistant Examiner*—Maurice Stevens
(74) *Attorney, Agent, or Firm*—Ostrolenk, Faber, Gerb & Soffen, LLP

(57) ABSTRACT

At the time of automatic gear changing without declutching in a mechanical stepped gearbox (6) in a motor vehicle, the speed of the gearbox output shaft (36) is detected and any speed change occurring immediately after disengagement of a gear to neutral position results in adjustment of a predetermined zero-torque level for the engine as a function of the speed change.

8 Claims, 1 Drawing Sheet

METHOD OF GEAR CHANGING IN A MOTOR VEHICLE

TECHNICAL DATA

Figure 1:
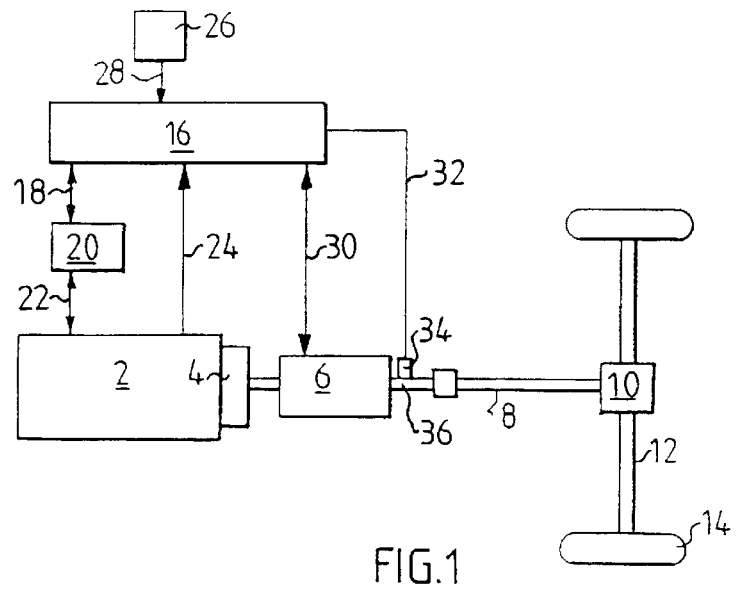

The invention relates to a method of automatic gear changing in a mechanical stepped gearbox, and particularly to adjustment of the torque delivered by the engine during a gear change.

STATE OF THE ART

Automatic gear changing in mechanical stepped gearboxes requires the torque delivered from the engine to be adjusted in order to reduce the torque transmitted at the point of contact of the relevant gears. At the time of gear disengagement it is desirable for there to be a torque-free state at the contact point between the gears in the gearbox, but since it is not practically possible to measure the torque at the gear contact point the torque adjustment has to be achieved indirectly by adjusting the torque delivered from the engine. SE,C,9401653-2 refers to a solution whereby gear changing takes place without the disc clutch being released. In this case a gear change is preceded by the engine torque being adjusted towards a zero-torque level which is intended to lighten the load on the gearbox during the gear change. At this stage the torque with which the engine is modulated is calculated on the basis of available data concerning the engine, its moment of inertia, its internal torque and the like. The modulated torque may also depend on whether any power take-offs are operating or not.

Disadvantages of this method are that there is no direct measurement of the torque and that the modulation is based on the expected behavior of the engine. It is therefore not known whether the modulated torque is correct or not. The manufacture of engines and the various driveline components may involve tolerance differences which result in each individual vehicle having different characteristics. Even if the behavior of an engine can be predicted correctly when it is new, its characteristics will change over time and with engine wear. This means that the engine torque modulated over time is probably not the same as when the engine was new. This in its turn means that gear changing may become difficult and/or that it is unacceptably delayed in certain circumstances. Oscillations in the control system may result in a very long scaling-in time being required for being able to determine correctly the fuel quantity which gives constant synchronous speed.

SE,C,9600454-4 refers to a solution which aims at improving that described above. To this end, a measurement is carried out at each gear change to ascertain whether the modulated zero-torque was correct. If it was not, the incorrect torque detected is used to correct the original zero-torque value so that before a subsequent gear disengagement the engine is modulated with a more correct zero-torque value. During the measurement, the amount of change in the engine speed with the fuel supply unchanged is registered for a certain measuring period after the gear disengagement and with the gearbox in neutral position. Knowing the length of the measuring period and the engine's moment of inertia provides a measure of the corresponding torque deviation, i.e. the amount of torque by which the zero-torque value applied needs adjusting so that gear disengagement can take place in a torque-free state of the gearbox. The corrected torque level is used as a basis for a calculation which determines when correct gear disengagement will take place.

A disadvantage of this method is that the measurement takes a relatively long time, approximately 0.5 second or longer, thereby adversely affecting total gearchange time. Particularly when driving on steep uphill runs with heavy loads it is desirable to have the shortest possible gearchange time so that the vehicle will not lose too much velocity during gear changes.

Experience also shows that for technical reasons of engine design it has proved difficult in the control of new engine systems to achieve a simple match between the fuel quantity supplied and the torque obtained at the low loads which prevail at the time of gear changes. A given quantity of fuel does not always result in the intended engine torque, so setting the desired zero torque becomes unreliable, with consequently problematic gear changing.

Zero torque not prevailing at the time of gear disengagement is primarily perceived as a disturbance to comfort whereby an oscillation is initiated in the driveline. This oscillation then causes a time delay before the next gear can be engaged. The engine's zero torque depends mainly on its internal friction and may therefore vary with such factors as wear, temperature and engine speed. The determination and correction of the zero torque has therefore to be carried out at regular intervals so that there is an applicable value of it for the whole life of the vehicle.

OBJECTS OF THE INVENTION

One object of the invention is to make it possible more reliably than previously to ensure that the torque transmitted in the gearbox will be nil at the time of gear changes. A further object is to be able to shorten the time between disengaging one gear and engaging the next.

DESCRIPTION OF THE INVENTION

The objects indicated above are achieved by the invention having an effective engine torque level adjustment for affecting the gear change. A control system reduces the torque transmitted in the gear box at the time of the gear change by adjusting the torque delivered by the engine to a predetermined zero torque level. Disengagement of a gear to the neutral position takes place at that zero torque level. The zero torque level is corrected between gear changes if there is a difference between the predetermined zero torque level and the actual zero torque level that is sensed. For this purpose, the speed of the gear box output shaft is detected. Then there is a speed change during a predetermined short period of time immediately after disengagement of the operative gear to the neutral position which adjusts the predetermined zero torque level as a function of the speed change. In particular, a speed change in the form of an increase raises the zero torque level while a speed change in the form of a speed reduction lowers the zero torque level. The predetermined short period of time amounts to not more than 50 ms and the adaptation of the engine speed for engaging another gear, in particular, a different gear commences at the time of disengagement of the previous gear. The solution adopted according to the invention results in the engine torque adjustment being possible with greater precision than previously. It also makes it possible to shorten the time needed between disengaging one gear and engaging the next.

The method according to the invention makes it possible to achieve more reliable and quicker gear changes, particularly when driving with heavy loads on uphill runs.

Other features distinguishing the invention are indicated by the following description of an embodiment with reference to the attached drawings.

LIST OF DRAWINGS

Figure 2:
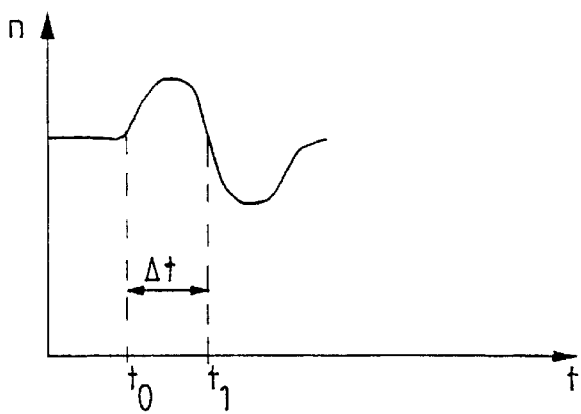
Figure 3:
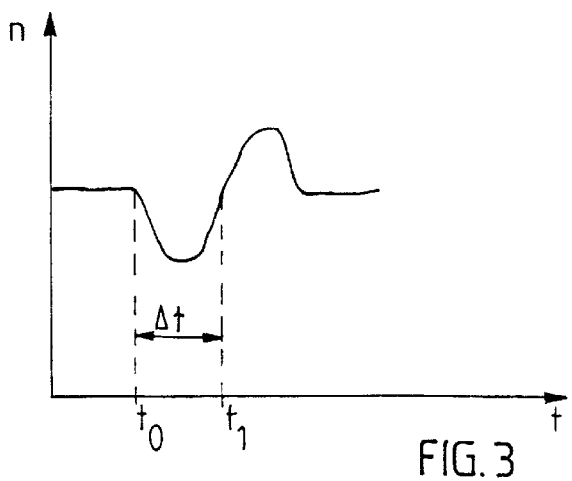

FIG. 1 shows a schematic structure of a gearchange system for mechanical stepped gearboxes in a vehicle, and FIGS. 2 and 3 show schematically the speed of the gearbox output shaft as a function of time during gear disengagement when the engine torque is respectively too low and too high.

DESCRIPTION OF AN EMBODIMENT

FIG. 1 shows a gearchange system for monitoring and controlling computer-assisted gear changing in a mechanical gearbox in a motor vehicle. The structure and operation of the system correspond largely to those of the system described in the aforesaid SE,C,9401653-2 and SE,C, 96004544, so the only components depicted are those required for understanding the present invention.

The vehicle is powered by a combustion engine 2, preferably a diesel engine, which is connected via a clutch 4, a mechanical stepped gearbox 6, a propeller shaft 8, a final gear and a driving shaft 12 to the vehicle's driving wheels 14. In this embodiment the clutch 4 is only intended to be operated manually at low vehicle speeds and when starting and stopping. At the time of gear changes while the vehicle is otherwise in motion, the clutch 4 is intended to be operated neither manually nor automatically, so gear changes then take place with the clutch 4 engaged and acting as a drive power transmitting connection between the engine 2 and the gearbox 6.

This gearchange system effects gear changes partly by adjusting the engine speed and the engine torque at the time of gear changes and partly by operating the servos in the gearbox so as to disengage the operative gear and engage the next gear.

The clutch 4 remaining engaged during gear changes results in severe engine control requirements if gear chances are to take place with the shortest possible torque break in the mechanical stepped gearbox and with torque-free disengagement of a gear and good speed synchronization at the time of engagement of the next gear.

The gearchange system incorporates a control unit 16 provided with a microcomputer and connected by various lines to various components of the system. These connections are used for transmitting various signals as illustrated by arrows in FIG. 1. The control unit 16 also has two-way connections whereby it sends output signals to and receives input signals from a multiplicity of control units via a number of links represented in FIG. 1 by bidirectional arrows. Via a link 18 with the engine's fuel injection system 20, which is itself connected to various sensors (not further described here), the control unit 16 receives information on the engine speed. The control unit 16 also receives via the link 18 corresponding information on the engine torque, which is in practice determined on the basis of the fuel quantity injected. Via a link 22 the fuel injection system 20 adjusts the fuel quantity supplied to the engine's injectors. During gear changing the control unit 16 provides the fuel injection system 20 with signals which cause the engine 2 to be modulated with the desired torque.

Via a line 24 the control unit 16 receives from a temperature sensor in the engine a signal representing the engine temperature or, in practice, the temperature of the engine coolant. A sensor 26 provides the control unit 16 via a line 28 with information on whether any power take-offs are operating and imposing extra loads on the engine.

Via a link 30 the control unit 16 is connected to various solenoid valves in the gearbox 6 which activate the servos to engage and disengage gears. This link 30 is also used for providing the control unit 16 with signals which represent the operating state of the gearbox 6 and indicate which gear is engaged and, during gear changing, with gearchange signals which represent the various stages of the gear change.

Via a line 32 the control unit 16 receives from a speed sensor 34 on the gearbox output shaft 36 information on the latter's speed. The control unit 16 is also connected to other vehicle operating controls (not depicted), e.g. gear selector, accelerator pedal, brake pedal, retarder, etc. As these controls operate conventionally and do not distinguish the method according to the invention, further description of them is omitted.

Gear changing is initiated entirely automatically if the driver has selected an automatic position or manually if the driver has selected a manual position. Irrespective of whether gear changing is initiated automatically by the control system or manually by the driver, it is effected by the control unit 16 without the clutch 4 having to be operated.

For a gear change to take place smoothly it is generally desirable first to reduce the engine torque to a level corresponding to zero torque in the gearbox, so that neutral position can be reached. To change to a new gear, the engine speed is thereafter adjusted so that it matches the propeller shaft speed, i.e. the speed of the gearbox output shaft. Thereafter the engine torque is increased to a level desired by the driver.

A gear change initiated in a wrong torque situation, e.g. because the predetermined zero-torque level was not correct, is primarily perceived as a disturbance of comfort whereby an oscillation occurs in the driveline. This oscillation results in longer gear changing time, since the next gear cannot be engaged until the oscillations fade away. It also results in the vehicle being jerked, which is disturbing for the driver and causes unnecessary wear on mechanical components, e.g. the gearbox.

With the type of gear changing to which the invention refers, at the commencement of a gear change the engine torque is reduced according to a predetermined torque profile. Gear disengagement to neutral position is then initiated at a time selected such that the actual gear disengagement will take place when the torque transmitted in the gearbox is nil. It is well known that this zero-torque level will to some extent vary as a result of varying operating conditions, wear, etc.

It has according to the invention been found possible by studying the speed of the gearbox output shaft 36 at the time of gear disengagement to gain a good understanding of how the zero-torque level used needs to be adjusted.

The invention is based on the fact that when the vehicle is running there will be a certain twist of the drive shaft due to the transmitted torque. The propeller shaft will act like a pre-stressed spring. During a gear change this spring/shaft will be "released" and there will be a change in the detected speed. This detected speed change will have a certain amplitude corresponding to how much the transmitted torque differs from the predetermined zero torque level, and it will have a direction (increase or decrease) corresponding to if the predetermined zero level was too low or too high. This is shown on FIGS. 2 and 3.

FIG.2 depicts a situation in which disengagement of a gear to neutral position at time to takes place when the when the shaft has been prestressed too much, or; when the engine's zero torque is too low. The result is that the detected speed n of the gearbox output shaft 36 initially increases, i.e. assumes a positive amplitude, before it approaches the value which corresponds to the vehicle speed. Therefore the zero torque level should be raised. The time $\Delta t$ for the first oscillation between $t_0$ and $t_1$ on the curve is very short, of the order of approximately 20 ms. Studying the change in the gearbox output shaft speed therefore requires its measurement with great accuracy at the time of gear disengagement.

FIG.3 shows a contrasting situation in which disengagement of a gear to neutral position at time $t_0$ takes place when the shaft has been prestressed insufficiently, or; when the engine's zero torque is too high. The result in this case is that the detected speed n of the gearbox output shaft 36 initially decreases, i.e. assumes a negative amplitude, before it approaches the value which corresponds to the vehicle speed. Therefore the zero torque level should be lowered. The time $\Delta t$ for the first oscillation between $t_0$ and $t_1$ on the curve is of the same order of magnitude (approximately 20 ms) as in the previous case.

It thus emerges that ascertaining whether the speed change initially has a positive or negative amplitude also makes it possible to ascertain whether the engine zero torque applied at the time of a gear change was too low or too high. This provides a basis for increasing or decreasing the zero torque for the next gear change, i.e. for updating the zero torque before a subsequent gear change.

It has in practice been found that necessary information on the appearance of this speed curve can be obtained with a measuring time which need not be longer than approximately 50 ms, since only the first oscillation on the curve is really of interest and experience shows that it is of sufficiently short duration to be comprised within that interval.

The magnitude of the speed amplitude provides some idea of the magnitude of the zero torque error and can for small amplitudes and small torque errors provide a basis for the required torque correction.

A method which has proved simpler in practice is to apply, when a speed change is observed, a predetermined torque correction in the desired direction and thus at each successive gear change to allow the control system to seek out a zero-torque value at which the speed change is acceptably small. After a relatively small number of gear changes the control system normally achieves the desired updating, which is naturally executed for a value matrix pertaining to the particular operating situation, since different operating situations, e.g. with or without the operation of certain auxiliary devices which impose loads on the engine, result in different engine operating situations.

An important advantage of the method according to the invention is that it makes it possible to ascertain very quickly after a gear disengagement whether and how the zero torque needs updating. This means that in practice it is possible immediately after gear disengagement to begin adjusting the engine speed to a suitable value for the next gear. This is particularly useful when driving with heavy loads on uphill runs, since gear changes can take place more quickly and the vehicle will not lose so much velocity during gear changes.

In other words, it will no longer be necessary to delay gear changing in order to be able, for a certain period of time during gear changes, to study how the engine behaves at a supposed zero-torque load with the gearbox in neutral position.

A further advantage is being able to obtain a reliable indication of how the zero-torque load will change without having to keep the engine's s fuel supply at such a low level that the zero-torque level is maintained long enough for carrying out desired measurements on the engine. This has in particular been found in practice to entail considerable difficulties in achieving sufficient accuracy in modulated zero-torque, inter alia because of hydraulic phenomena in the fuel system. Such difficulties are avoided according to the invention by measurement at a long-lasting zero torque no longer being necessary.

The solution adopted makes reliable and smooth gear changing possible with a simple mechanical gearbox which is considerably less expensive than an automatic gearbox and is also more efficient.

What is claimed is:

1. A method of automatically changing gears in a mechanical step gearbox in a motor vehicle, wherein the gearbox has an output shaft that operates at a measurable speed; the method comprising the steps of:

reducing torque transmitted in the gearbox at the time gears are to be changed by adjusting the torque delivered by an engine to a predetermined zero torque level, then disengaging a then operative gear to place the gearbox in a neutral position while retaining a clutch between the engine and the gearbox in engagement;

later engaging a gear for completing a gear change; and correcting the predetermined zero torque level between gear changes if there is a difference between the predetermined zero torque level and the actual zero torque level, the correcting comprising detecting a speed of a gearbox output shaft during a predetermined short period of time immediately after disengagement of the operative gear to the neutral position and adjusting the predetermined zero torque level toward the actual zero torque level as a function of a speed change detected during the short period of time.

2. The method of claim 1, wherein the predetermined zero torque level is increased if the detected speed change is a speed increase.

3. The method of claim 2, wherein when the predetermined zero torque level is decreased if the detected speed change is a speed reduction.

4. The method of claim 1, wherein when the predetermined zero torque level is increased if the detected speed change is a speed reduction.

5. The method of claim 1, wherein the predetermined period of time is not more than 50 ms.

6. The method of claim 1, wherein correction of the zero torque level is made in proportion to the amplitude of the detected speed change of the gearbox output shaft.

7. The method of claim 1, further comprising commencing of adaptation of the engine speed for reengaging of a different gear at the time of disengagement of a gear.

8. The method of claim 2, wherein the gear that is reengaged is a different gear than the operative gear previously disengaged.

* * * * *